Jan. 12, 1937. P. MERTZ Re. 20,239

TELEVISION

Original Filed July 24, 1928

INVENTOR
PIERRE MERTZ
BY
ATTORNEY

Reissued Jan. 12, 1937

Re. 20,239

UNITED STATES PATENT OFFICE 20,239

TELEVISION

Pierre Mertz, Bellerose, N. Y., assignor to American Telephone and Telegraph Company, a corporation of New York Original No. 1,806,638, dated May 26, 1931, Serial No. 295,098, July 24, 1928. Application for reissue May 17, 1932, Serial No. 611,917

19 Claims. (Cl. 178—6)

This invention relates to electro-optical systems and more particularly to television.

The principal object of this invention is to improve the resolution in electro-optical image producing systems.

In accordance with the invention, this object is in general accomplished by moving the image elements from one scanning to the next to cause overlapping. The distortion in the received image due to the coarseness of these elements then varies for successive scannings, and the average distortion taken over several scannings is in general less than the distortion for any one scanning. Consequently, if the eye viewing the image averages the impression from several successive scannings, the distortion visible to it is in general less than if the elements should remain fixed from scanning to scanning.

In a specific arrangement, which is illustrative of the invention, the scanning discs at both the transmitter and the receiver of a television system such, for example, as the system disclosed in a patent of H. E. Ives and Frank Gray, No. 2,037,471, patented April 14, 1936, are each provided with two sets of spirally arranged apertures, one set on each half of the disc. One set is adapted to scan an image field in a plurality of adjacent elemental line traces. The other set then scans the same field also in a plurality of line traces but each of these traces overlaps adjacent portions of two adjacent traces scanned by the first set. Thus, for each revolution of the scanning disc, two successive scannings are accomplished and the image elements are moved from one scanning to the next.

This invention is not limited to television systems but is usable wherever optical images are produced by multiple exposures of an image field by the exposure of elemental areas thereof.

The invention will now be described more in detail, having reference to the accompanying drawing.

Figure 1:
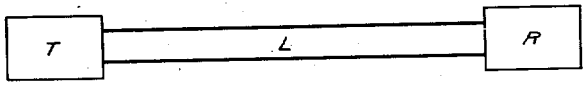
Figure 1 shows schematically a television system.

In the system of Fig. 1 the television transmitter T is associated with a cooperating receiver R by a transmission channel such as the line L. Reference may be had to the patent of Messrs. Ives and Gray supra, for further details of equipment suitable for use in the system of Fig. 1, with the exception of the scanning disc, details of which are shown in Fig. 2.

As the scanning discs rotate, elemental lines of the image field are scanned in succession. A complete scanning as herein used is one in which the scanning path pattern is complete.

In systems heretofore known, complete scannings have covered either identical elemental areas or non-overlapping elemental areas. In the present invention, as observation of Figs. 2 and 3 discloses, the paths of complete scannings partially overlap.

Figure 2:
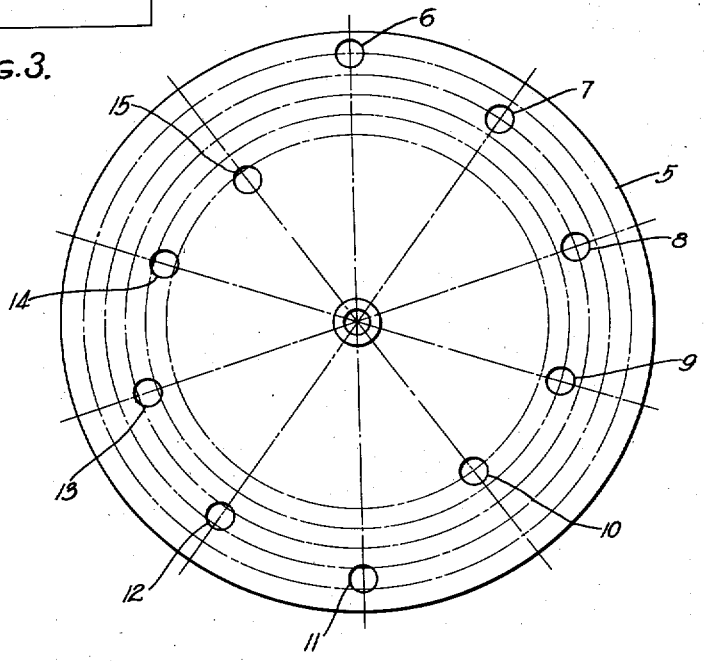
Fig. 2 is a scanning disc for use in the system of Fig. 1.

In the disc 5 of Fig. 2 only five apertures are shown to effect a complete scanning. In actual practice, a larger number of apertures is in general used, the smaller number being shown herein for purpose of simplification.

Figure 3:
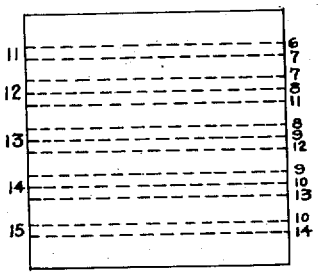
Fig. 3 is a schematic diagram showing the relation of the lines scanned by the two sets of apertures shown in Fig. 2.

Apertures 6 to 10 produce one complete scanning during a half revolution of the disc 5 while apertures 11 to 15 produce another scanning during the next half revolution. As shown by the dotted lines, aperture 11 follows a path partially overlapping the paths followed by apertures 6 and 7. Overlapping of the paths likewise occurs for the other apertures. The relation of these overlapping paths is shown in Fig. 3. The numbers 11, 12, 13, 14 and 15 represent paths which partially overlap the paths represented by the dotted lines and numbers directly opposite; for example, path 12 overlaps portions of paths 11, 8, and 7, represented by the three dotted lines opposite these numbers.

A further improvement in resolution of the produced image may be effected by providing more than two sets of apertures for the disc 5. It is then necessary that the positions of the paths for successive scannings be in some irregular order, as a regular order might cause an apparent motion of the picture elements in the viewing field which would be annoying. The extent to which improvement can be effected in this manner will depend upon the number of successive scannings over which the average is taken by the eye in determining its impression.

The invention is, of course, not limited to the particular arrangement described in detail but is defined by the scope of the appended claims.

What is claimed is:

1. The method of scanning to produce image currents which comprises repeatedly scanning the entire area of a field of view and causing each scanning line of the entire path of one complete scanning to partially overlap two scanning lines of a preceding one but not to completely overlie any scanning line of said preceding one.

2. The method of scanning to produce image currents which comprises repeatedly scanning the entire area of a field of view and cyclically shifting the scanning path between complete scannings so that each scanning line of a complete path partially overlaps two scanning lines of a preceding one.

3. In an electro-optical system, means to repeatedly scan the entire area of a field of view along line series of elemental areas thereof, comprising means for causing each scanning to traverse a trace each line of which overlaps simultaneously portions only of only two lines of the trace of the preceding scanning.

4. In an electro-optical system, means to repeatedly scan the entire area of a field of view along line series of elemental areas thereof, comprising means for causing each scanning to traverse a trace each line of which overlaps simultaneously at least one-half of each of two adjacent lines of the trace of the preceding scanning but does not completely overlie any scanning line of said preceding scanning.

5. In an electro-optical system, means for repeatedly successively scanning contiguous line series of elemental areas of the entire area of a field of view, said means comprising a scanning member having a plurality of sets of scanning apertures so placed that each line scanned by one set overlaps substantially half of two lines scanned by another set and all the sets each as a whole being effective in non-overlapping time intervals.

6. In an image producing system, a scanning disc, a set of apertures on one sector of said disc arranged to scan the entire area of an image field in a plurality of elemental lines as the disc rotates, and a second set of apertures on another discrete sector of said disc arranged to scan the entire area of the same image field and radially displaced with respect to the first set of apertures by a substantial portion of the diameter of the apertures so that each line scanned by one set of apertures overlaps substantially half of two lines scanned by the other set.

7. The method of scanning to produce image currents which comprises scanning the entire area of a field of view, and again scanning substantially the entire area of said field of view in such a manner that each line traced by the second scanning overlaps portions of two lines traced by the first scanning but does not completely overlie any line of said first scanning.

8. The method of scanning to produce image currents which comprises repeatedly completely scanning with overlapping lines, the entire area of a field of view, and cyclically shifting the scanning path after each complete scanning so that each line of a succeeding scanning overlaps portions of two lines overlapped in the previous scanning.

9. In an electro-optical system, means for repeatedly successively scanning contiguous line series of elemental areas of the entire area of a field of view, said means comprising a scanning member having a set of scanning apertures so placed that the line scanned by each aperture is partially overlapped by the line scanned by the next succeeding aperture, and having an additional set of scanning apertures so placed that the line scanned by each of these apertures partially overlaps two of the overlapped lines scanned by the first mentioned set of scanning apertures.

10. In an image producing system, a scanning disc, a set of apertures on one portion of said disc arranged to scan as the disc rotates an image field in a plurality of elemental lines, each one of which partially overlaps the preceding line, and a second set of apertures on another portion of said disc arranged to scan the same image field and radially displaced with respect to the first set of apertures by a substantial portion of the diameter of the apertures so that the line traced by each of these apertures overlaps portions of the overlapped lines of the first mentioned set of apertures.

11. The method of scanning to produce image currents which comprises repeatedly completely scanning the entire area of a field of view, the traces produced by each complete scanning completely covering the field, and causing each line of the entire path of one complete scanning to only partially overlap two lines of the path of the preceding scanning and not to completely overlie any line of said preceding scanning.

12. The method of scanning to produce image currents which comprises scanning the entire area of a field of view by causing each scanning line to partially overlap that of a preceding one, and again scanning substantially the entire area of said field of view by lines which overlap each other and also overlap only portions of lines overlapped in the first scanning.

13. The method of scanning for image production which comprises repeatedly scanning in the same general direction the entire area of a field of view and causing each scanning line of the entire path of one complete scanning to partially overlap two adjacent scanning lines of a preceding one but not to completely overlie any scanning line of said preceding one.

14. Scanning apparatus for television comprising means for repeatedly scanning the entire area of a field of view in a succession of substantially parallel different elemental strips in the same general direction across the field of view, and means to cause each strip of one scanning of the entire area to overlap at least two strips of a preceding scanning of the entire area but not to completely overlie any strip of said preceding scanning, each such overlapped strip scannings taking place within the period during which the eye averages its impressions.

15. Scanning apparatus for television comprising means for repeatedly scanning the entire area of a field of view in a succession of substantially parallel different elemental strips in the same general direction across the field of view, and means to cause each strip of one scanning of the entire area to overlap substantially equally two strips of a preceding scanning of the entire area but not to completely overlie any strip of said preceding scanning, each such overlapped strip scannings taking place within the period during which the eye averages its impressions.

16. The method of scanning for image production which comprises repeatedly completely scanning the entire area of a field of view, the traces produced by each complete scanning completely covering the field, and causing each line of the entire path of one complete scanning to only partially overlap two lines of the path of the preceding scanning and not to completely overlie any line of said preceding scanning, each such overlapped line scannings taking place within the period during which the eye averages its impressions.

17. A television system comprising means to scan during a first interval of time the entire area of a field of view in a series of substantially parallel linear elemental strips distributed across the field transverse to the direction of scanning, means to again scan during a later interval of time the entire area of substantially the same field of view in a second series of linear elemental strips distributed across the field transverse to the direction of scanning and parallel to said first strips, so that every strip of said second series overlaps one of said strips of said first series substantially uniformly throughout its length but does not completely overlie any strip scanned during said first interval, and means to cause both said scannings to take place within the period during which the eye averages its impressions.

18. A television system comprising means to scan during a first interval of time the entire area of a field of view in a series of substantially parallel linear elemental strips distributed across the field transverse to the direction of scanning, means to again scan during a later interval of time the entire area of substantially the same field of view in a second series of linear elemental strips distributed across the field transverse to the direction of scanning and parallel to said first strips, so that every strip of said second series overlaps one of said strips of said first series throughout its length but does not completely overlie any strip scanned during said first interval, the proportionate overlap of each pair of overlapping strips being uniform throughout their length, and means to cause both said scannings to take place within the period during which the eye averages its impressions.

19. The method of scanning for image production which comprises repeatedly scanning the entire area of a field of view, and abruptly shifting the scanning path between complete scannings so that each scanning line of a complete path partially overlaps two scanning lines of a preceding one.

PIERRE MERTZ.